Feb. 3, 1970  P. MAYER  3,493,306
CELL FOR PHOTOMETRIC AND/OR SPECTROPHOTOMETRIC MEASUREMENTS
Filed March 21, 1966  3 Sheets-Sheet 1
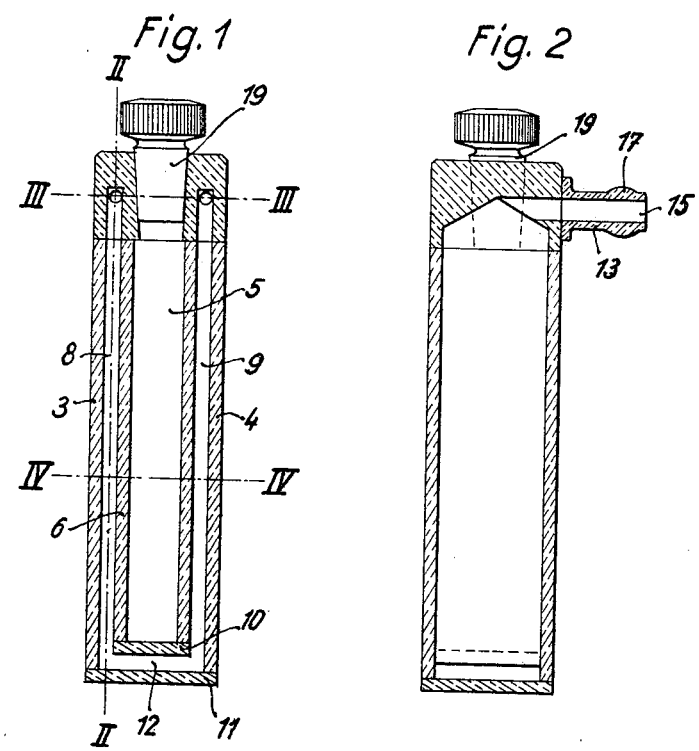
INVENTOR
Peter Mayer
BY
ATTORNEY Feb. 3, 1970 P. MAYER 3,493,306
CELL FOR PHOTOMETRIC AND/OR SPECTROPHOTOMETRIC MEASUREMENTS
Filed March 21, 1966 3 Sheets-Sheet 2
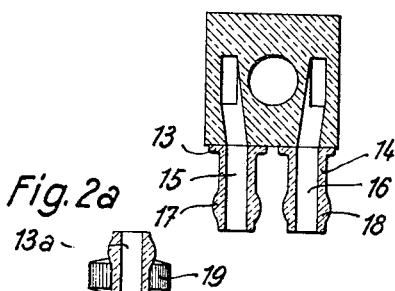
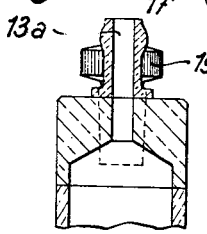
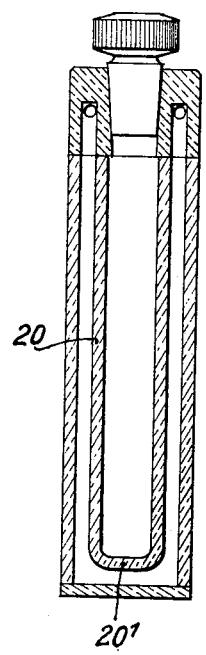
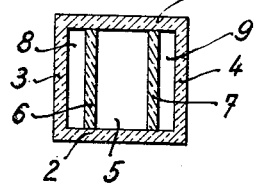
*INVENTOR*
Peter Mayer
BY
*ATTORNEY*

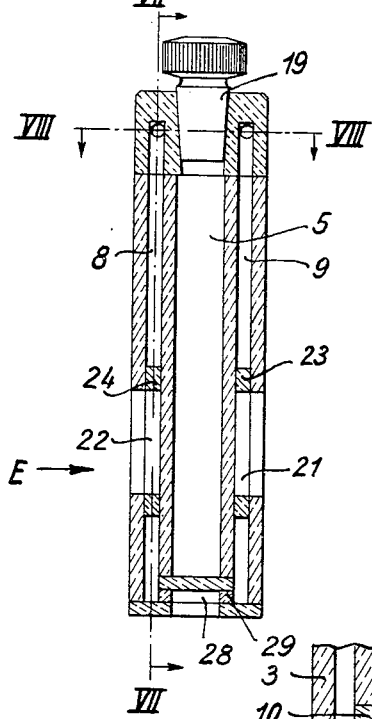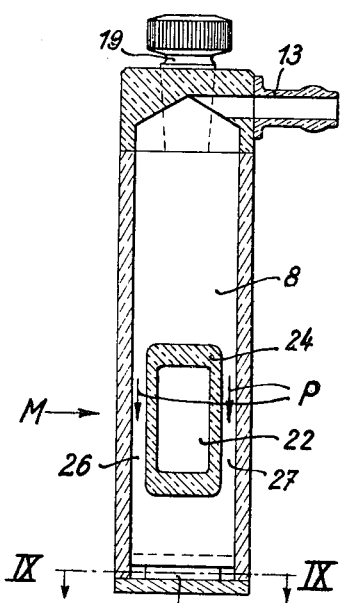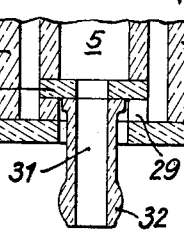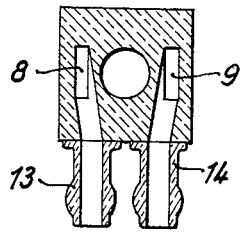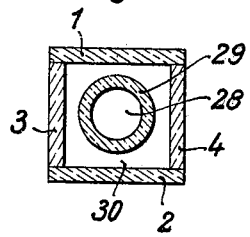

United States Patent Office 3,493,306
Patented Feb. 3, 1970

3,493,306
CELL FOR PHOTOMETRIC AND/OR SPECTRO-
PHOTOMETRIC MEASUREMENTS
Peter Mayer, Mullheim, Baden, Germany
Filed Mar. 21, 1966, Ser. No. 535,903
Claims priority, application Germany, Mar. 25, 1965,
H 55,581
Int. Cl. G01n 1/10
U.S. Cl. 356—246
8 Claims

ABSTRACT OF THE DISCLOSURE

A cell for photometric and spectrophotometric measurements of fluids comprising an outer container of a rectangular cross section; an inner container having a rectangular cross section of said outer and said inner walls integrally joined symmetrically at their upper peripheries into one unit, to form an outer thermo-stabilizing container with a hollow converting bottom between the outer and the inner walls, a central measuring chamber within the walls of said inner container; an upper inlet and an upper outlet orifice in said intermediate container; a supply orifice of fluid into said central measuring chamber, closing means for said central orifice, at least opposite portions of the opposite walls of said cell having fixed transparent areas extending vertically in the longitudinal direction of the said containers, windows for optical scanning, and means to said separate fluid window areas from the remainder of said outer container.

FIELD OF ART

This invention relates to a cell with a rectangular or square basal surface for photometric and/or spectrophotometric measurements.

The purpose of cells of the specified type is to permit also such measurements wherein the test substance in the interior of the cell can be kept during the entire period of measuring at a predetermined constant temperature which may be different in each individual case.

DESCRIPTION OF THE PRIOR ART

It is already known to surround cylindrical cells having a circular cross section partly with a heating jacket through which a tempering fluid is passed. However, such a thermocell with a circular cross section has considerable disadvantages. It requires much space so that it is no longer possible to insert a desired number of such cells, together with their heating jackets, in a standard cell holder. Due to its unfavourable circular form, the cell is partly freely exposed when inserted in its holder, whereby an increased heat transfer takes place which affects the constancy of the temperature.

Measuring cells with a quadrangular cross section, could be converted into a thermocell by inserting them in a thermocell holder. This, however, requires a great expenditure and does not produce a thermocell meeting the requirements of modern measuring techniques.

SUMMARY OF THE INVENTION

It is, therefore, an object of the present invention to provide a thermocell of quadrangular cross section which does not have the above-mentioned disadvantages.

This object is achieved according to the invention by providing a cell with a rectangular or square basal surface for photometric and/or spectrophotometric measurements, which comprises a measuring chamber having parallel inlet and outlet windows, hollow walls receiving a tempering fluid and surrounding the sides of said measuring chamber not penetrated by the measuring light, and a hollow bottom defining, together with said hollow walls, a circulation path for the tempering fluid.

This permits obtaining in a very simple manner a quadrangular thermocell while maintaining optimum conditions of heat economy and avoiding considerable additional expenditure, without affecting the advantageous measuring possibilities of a quadrangular cell.

According to a preferred embodiment of the invention, the hollow walls and the hollow bottom which surround the measuring chamber define a circulation path of U-shaped cross section for the tempering fluid with parallel surfaces on their outer sides. And a feed connection for the tempering fluid through the hollow walls and the hollow bottom is connected to the upper end of one upwardly extending leg of the U-shaped circulation path and an offtake connection for the tempering fluid is connected to the upper end of the other upwardly extending leg of the circulation path. Such a tempered cell corresponds in its outside appearance substantially to a usual quadrangular cell. When appropriately dimensioned, it even fits into a so-called standard cell holder having an opening of 12.5 mm. x 12.5 mm. in cross section for the insertion of the cell therein, and it permits combining several thermocells in a measuring set having the same number of cells as the set of quadrangular cells of the prior art. The thermocell proposed by the invention thus also permits saving of time when measurements are being carried out.

The new thermocell may be further developed in such a manner that it is particularly suitable for fluorescence or stray light measurements. According to a preferred embodiment, the exciting light acts on the measuring chamber from the bottom of the cell in the longitudinal direction thereof. For this purpose two parallel side walls of the measuring chamber which extend perpendicularly to the light-transmitting windows of the cell, have attached at their lower ends a small plane cover plate, which forms the lower closing face of the measuring chamber. The light-transmitting windows which close the measuring chamber on the two other opposite sides are chosen to be of such a width and such a height that they also form the closing faces for the hollow walls and the hollow bottom receiving the tempering fluid.

According to another embodiment of the new thermocell, for carrying out stray light and fluorescence measurements, transparent windows may also be provided in the hollow walls receiving the tempering fluid. These windows are arranged opposite to one another in the hollow walls and permit the passage of the exciting light through the measuring chamber in transverse direction at right angles to the passage of the measuring light.

In a further advantageous embodiment of the new thermocell consists in that an outwardly extending small connecting pipe or the like, which can be opened and closed, is connected to the bottom of the cell and establishes the connection to the measuring chamber of the cell, whereby a flow-through and/or discharge cell is formed which can be provided with a thermostat.

BRIEF DESCRIPTION OF THE DRAWINGS

Several embodiments of the invention will now be described by way of example and with reference to the accompanying drawings, in which FIG. 1 is a central longitudinal section through a thermocell according to the invention;

FIG. 2 is a longitudinal section through the cell of FIG. 1 taken on the line II—II of FIG. 1;

FIG. 2a is a similar section through the head of the cell, but showing the feed and offtake connections for the tempering fluid extending in the longitudinal direction of the cell;

FIG. 3 is a horizontal cross section through the cell of FIG. 1 taken on the line III—III of FIG. 1;

FIG. 4 is a horizontal cross section through the cell of FIG. 1 taken on the line IV–IV of FIG. 1;

FIG. 5 is a central longitudinal section through a slightly modified embodiment of the cell according to the invention;

FIG. 6 is a central longitudinal section through another embodiment of the cell having transparent windows in the hollow walls receiving the tempering fluid;

FIG. 6a is a longitudinal section, on a larger scale, through the bottom of a cell constructed as a flow-through or run-out cell;

FIG. 7 is a longitudinal section through the cell of FIG. 6 taken on the line VII—VII of FIG. 6;

FIG. 8 is a horizontal cross section through the cell of FIG. 6 taken on the line VIII—VIII of FIG. 6, and FIG. 9 is a horizontal cross section through the cell of FIG. 6 taken on the line IX—IX of FIG. 7.

DESCRIPTION OF THE PREFERRED EMBODIMENTS

FIGS. 1 to 4 show a measuring cell formed by four small outer wall plates 1, 2, 3 and 4 so as to correspond in outer appearance and size to a normal so-called quadrangular measuring cell. Of these outer wall plates the plates 1 and 2 have parallel faces and are highly transparent. These plates 1 and 2 form transparent windows for the measuring light which has to pass through a measuring chamber 5 filled with a test fluid. This measuring chamber 5 is defined laterally by two small wall plates 6 and 7 which are inserted between the transparent plates 1 and 2. Between the plates 6 and 3 and plates 7 and 4 thus two hollow spaces 8 and 9 are formed for the reception of a tempering fluid. The measuring chamber 5 is closed at its bottom by a small quadrangular plate 10 which is attached to the lower ends of the plates 6 and 7 defining laterally the measuring chamber, and which is also connected to the transparent plates 1 and 2 of the cell near the lower ends thereof, the arrangement being such that between the bottom plate 10 of the measuring chamber 5 and a small bottom plate 11 of the cell a hollow space 12 is formed which communicates with the lateral hollow spaces 8 and 9.

The hollow spaces 8 and 9 together with the hollow space 12 surround the measuring chamber 5 over a large area on both sides and at the bottom so as to leave free only the two windows formed by the transparent plates 1 and 2 for the passage of the measuring light therethrough. These hollow spaces contain a tempering fluid for maintaining the test fluid in the measuring chamber 5 during the measuring operation at an accurately constant temperature which may be different in each individual case. The tempering fluid is caused to circulate in the hollow spaces 8, 9 and 12. It is supplied into, and carried off from, the hollow spaces at the upper ends of the hollow spaces 8 and 9 through small connecting pipes 13 and 14 communicating with their bores 15 and 16 with the hollow spaces surrounding the measuring chamber 5 in U fashion. Expediently, the tempering fluid is fed and carried off through two flexible tubes which can be fitted on the connecting pipes 13 and 14 and are retained thereon by means of olive-shaped bosses 17 and 18. Accordingly to FIGS. 1 to 3, the connecting pipes 13 and 14 are fixed to the front side of the cell in such a manner that they extend parallel to the outer wall plates 3 and 4 but do not laterally project relative thereto. The measuring chamber 5 is to be closed at its top end by a conical plug 19. The connections for the tempering fluid may, however, also be so provided as to extend upwardly from the head of the cell, as indicated e.g. at 13a in FIG. 2a. According to the embodiment shown in FIG. 5, the measuring chamber 5 is formed by a single small plate 20 which is bent into U shape and has its base 20¹ not attached in the form of a small separate plate.

As shown in FIGS. 6 to 9, the measuring chamber 5 has, additionally to the plates 1 and 2 serving as windows, two further parallel light-transmitting windows 21 and 22 associated therewith which are formed by two short rectangular tubular pieces 23 and 24 interposed between the plates 4 and 7 and 3 and 6, respectively, so as to extend through the hollow spaces 9 and 8. These windows 21 and 22 are so dimensioned that they permit the passage of a sufficient amount of exciting light which passes through the test fluid in the measuring chamber 5 in the direction of arrow E of FIG. 6 at right angles to the measuring light passing through the measuring chamber 5 in the direction of arrow M of FIG. 7. In this case the plates 6 and 7 of the measuring chamber 5 are highly transparent at least in the region of the windows 21 and 22. As can be seen from FIG. 7, sufficient spaces 26 and 27 are left on the outer longitudinal sides of the windows 21 and 22 to permit circulation of the tempering fluid in the direction of arrows P.

To be able to excite the test fluid in the measuring chamber 5 by light also from the bottom of the cell, a window 28 can be provided in the bottom of the cell. This window is formed by a short tubular piece 29 which keeps the hollow space 12 free from tempering fluid in the region it occupies, but leaves a sufficient space 30 on its outer side for the circulation of the tempering fluid.

According to the embodiment shown in FIG. 6a, the cell as proposed by the invention can, for example, also be constructed as a flow-through and/or run-out cell adapted to be provided with a thermostat. For this purpose the bottom plate 10 of the measuring chamber 5 of the cell has a downwardly extending small connecting pipe 31 connected thereto which can be provided with an olive-shaped boss 32 or the like for retaining a flexible tube thereon which can be fitted on the connecting pipe and is closable e.g. by pinching.

The invention is not restricted to the embodiments described above. It is also applicable to quadrangular cells of different construction and, if desired, to so-called combination cells which are suitable for carrying out measurements of different kinds.

I claim:

1. A cell for photometric and spectrophotometric measurements of fluids comprising an outer container of a rectangular cross section; an inner container having a rectangular cross section of said outer and said inner walls integrally joined symmetrically at their upper peripheries into one unit, to form an outer thermo-stabilizing container with a hollow converting bottom between the outer and the inner walls, a central measuring chamber within the walls of said inner container; an upper inlet and an upper outlet orifice in said intermediate container; a supply orifice for fluid into said central measuring chamber, closing means for said central orifice, at least opposite portions of the opposite walls of said cell having fixed transparent window areas extending vertically in the longitudinal direction of the said containers, for optical scanning, and means to separate said fluid tight window areas from the remainder of said outer container.

2. A measuring cell as claimed in claim 1, wherein the hollow walls and the hollow bottom which surround the measuring chamber define a circulation path of U-shaped cross section for the tempering fluid and have parallel surfaces on their outer sides and a feed connection for the tempering fluid arranged to pass through the hollow walls and the hollow bottom is connected to the upper end of one upwardly extending leg of the U-shaped circulation path and an offtake connection for the tempering fluid is connected to the upper end of the other upwardly extending leg of the circulation path.

3. A measuring cell as claimed in claim 2, wherein the measuring cell together with the hollow walls and the hollow bottom which form a tempering jacket surrounding the measuring chamber of the cell is constructed in height and outer cross-sectional form so as to fit into a holder for a non-jacketed cell, e.g. into a so-called standard holder having an opening of 12.5 mm. x 12.5 mm. in cross section for the insertion of the cell therein.

4. A measuring cell as claimed in claim 3, wherein two parallel side walls of the measuring chamber which extend perpendicularly to the light-transmitting windows of the cell have at their lower ends a small plane cover plate attached thereto which forms the lower closing face of the measuring chamber, whereas the light-transmitting windows which close the measuring chamber on the two other opposite sides thereof are chosen to be of such a width and such a height that they also form the closing faces for the hollow walls and the hollow bottom receiving the tempering fluid.

5. A measuring cell as claimed in claim 4, wherein light-transmitting windows which are kept free from tempering fluid are provided in the hollow walls receiving the tempering fluid and permit the passage of exciting light through the measuring chamber.

6. A measuring cell as claimed in claim 1, wherein a preferably circular light-transmitting window which is kept free from tempering fluid is provided in the hollow bottom of the cell.

7. A measuring cell as claimed in claim 6, wherein the windows in the hollow walls have such a size that they permit the tempering fluid arranged to circulate in the longitudinal direction of the cell to pass externally along the two lateral sides of the windows and these windows are preferably of rectangular form with their longitudinal sides extending in the longitudinal direction of the cell, all transparent windows in the hollow walls and the hollow bottom being formed by short tubular pieces which are fitted transversely in the hollow walls and the hollow bottom of the cell.

8. A measuring cell as claimed in claim 7, wherein an outwardly extending small connecting pipe which can be opened and closed is connected to the bottom of the cell and establishes the connection to the measuring chamber of the cell so that a flow-through cell adapted to be provided with a thermostat is formed.

References Cited

UNITED STATES PATENTS

| | | |
|---|---|---|
| 2,744,440 | 5/1956 | Robertson et al. |
| 2,819,402 | 1/1958 | Watson et al. |
| 3,053,138 | 9/1962 | Sanz. |
| 3,113,171 | 12/1963 | Rouy. |
| 3,151,204 | 9/1964 | Stacy. |
| 3,345,910 | 10/1967 | Rosin et al. |

OTHER REFERENCES

"Measurement of Fluorescent Spectra of Liquids With a Modified Beckman DU Spectrophotometer," Huke, et al., J.O.S.A., vol. 43, No. 5, May 1953, pp. 440–404.

"Optical Absorbtion Cells," Bulletin #65, by Optical Cell Co., Inc., Brentwood, Md., Dec. 1, 1964, pp. 6, 7 & Assoc. Price List (2 pp.).

"A Jacketed Cell for the Bendix NPL Polarimeter," L. K. Dalton, J. Sci. Instrum., 1965, vol. 42, No. 5, pp. 353–4.

In Frarot - Tieftmperatur - Kuvette, G. Zundel, in "Chemie-Ing.-Technik," vol. 35 (1963), pp. 306–309.

Phoenix Precision Instrument Co. Data Sheet No. 156, February 1928, 2 pp.

JEWELL H. PEDERSEN, Primary Examiner

R. J. WEBSTER, Assistant Examiner